United States Patent
Samuels et al.

(10) Patent No.: US 8,915,746 B2
(45) Date of Patent: Dec. 23, 2014

(54) REVERSE THROUGH-BOARD LOW PROFILE MODULE CONNECTOR

(71) Applicant: Sierra Wireless, Inc., Richmond (CA)

(72) Inventors: Bruce Richard John Samuels, Lions Bay (CA); Edwin Sy Liu, Richmond (CA)

(73) Assignee: Sierra Wireless, Richmond, British Columbia (CA)

( * ) Notice: Subject to any disclaimer, the term of this patent is extended or adjusted under 35 U.S.C. 154(b) by 60 days.

(21) Appl. No.: 13/831,451

(22) Filed: Mar. 14, 2013

(65) Prior Publication Data

US 2014/0273548 A1    Sep. 18, 2014

(51) Int. Cl.
*H01R 12/00*   (2006.01)
*H01R 12/50*   (2011.01)
*H01R 43/20*   (2006.01)

(52) U.S. Cl.
CPC .......... *H01R 23/6806* (2013.01); *H01R 43/205* (2013.01)
USPC ............................................ 439/70; 439/76.1

(58) Field of Classification Search
USPC ............................. 439/65–73, 76.1, 525, 526
See application file for complete search history.

(56) References Cited

U.S. PATENT DOCUMENTS

| | | | |
|---|---|---|---|
| 6,607,400 B1 * | 8/2003 | Ko | 439/581 |
| 6,729,905 B1 * | 5/2004 | Hwang | 439/607.21 |
| 6,947,767 B2 | 9/2005 | Haga et al. | |
| 7,660,128 B2 | 2/2010 | Crews et al. | |
| 7,925,301 B2 | 4/2011 | Kubo | |
| 8,764,459 B2 * | 7/2014 | Decker et al. | 439/83 |
| 2005/0075138 A1 | 4/2005 | Page | |
| 2005/0075139 A1 | 4/2005 | Shapira | |
| 2006/0258192 A1 | 11/2006 | Yi et al. | |
| 2011/0183715 A1 | 7/2011 | Keane | |

FOREIGN PATENT DOCUMENTS

JP    8-265404    10/1996

OTHER PUBLICATIONS

"Smart Cards; UICC-Terminal Interface; Physical and Logical characteristics (Release 9)" ETSI TS 102 221 Technical Specification 2010, 175 pages.
"Smart Cards; UICC-Terminal Interface; Physical and Logical characteristics (Release 11)" ETSI TS 102 221 Technical Specification 2012, 181 pages.
"HSMD-Cxxx, HSMG-Cxxx, HSMH-Cxxx, HSMS-Cxxx, HSMY-Cxxx, Surface Mount Chip LEDs," Data Sheet, Avago Technologies, Mar. 5, 2012, 12 pages.
Tuominen, "Embedded Components in PCB" Imbera, Sep. 2008, 18 pages.
"Flatpack Installation," Merrimac, Mar. 25, 1996, 3 pages.

(Continued)

*Primary Examiner* — Khiem Nguyen
(74) *Attorney, Agent, or Firm* — McDermott Will & Emery LLP

(57) ABSTRACT

A connector component for operably coupling a removable integrated circuit component such as a Micro SIM™, to a host PCB is provided. The connector component is configured to fit within an aperture formed within the host PCB and houses the removable integrated circuit component within an internal cavity. The connector component includes a coupling portion configured for coupling to the top face of the host PCB, and a port for insertion and removal of the removable integrated circuit component which is exposed within the bottom face of the host PCB. The connector component may be made flush with the bottom face of the host PCB, and the host PCB may optionally be populated on one side only.

14 Claims, 4 Drawing Sheets

(56) References Cited

OTHER PUBLICATIONS

SIM3050 Product Specification, Global Connector Technology, Jan. 7, 2010.

SIM3050 3D, Global Connector Technology, 2010.

SIM 3050: SIM Card Connector, Retainer Type, 6 Pin SMT, Global Technology Ltd, Mar. 15, 2010.

* cited by examiner

REVERSE THROUGH-BOARD LOW PROFILE MODULE CONNECTOR

FIELD OF THE TECHNOLOGY

The present technology pertains in general to electronics hardware components such as sockets and connectors, and in particular to low-profile connectors for housing modules such as a Micro SIM™.

BACKGROUND

Miniaturization trends in electronic devices can often result in more desirable or useful products. For example, the Micro SIM™, used in a variety of wireless products such as cell phones and machine-to-machine devices, is 15 mm by 12 mm with a thickness of 0.76 mm, as specified for example in ETSI TS 102 221 V9.0.0. An even smaller Nano SIM™ has also been proposed, being 12.3 mm by 8.8 mm with a thickness of 0.67 mm, as specified for example in ETSI TS 102 221 V11.0.0.

A popular means for coupling a module such as a Micro SIM™ to a host device is by way of a socket or connector. The connector is attached to the host device, typically to a printed circuit board (PCB) thereof, and the module is inserted into the connector. However, the feasibility of using a given connector is impacted by various cost constraints, size constraints, access constraints, and the like.

For example, the SIM3050 SIM™ Card Connector from Global Connector Technologies is a 0.5 mm profile connector, as illustrated in FIG. 1, which can be mounted in a PCB cutout. It is noted that the SIM3050 accepts a mini SIM™ rather than a micro SIM™ or nano SIM™. Although this connector provides for a low-profile mounting point for a SIM™, it has several features which make it potentially problematic for a given application. In particular, a top face 100 of the SIM3050 includes connectors 110 for mounting to a component side of a PCB, and the SIM™ is also inserted into the SIM3050 through a port 120 in the top face 100. Thus, access to an at least partially populated side of the PCB is required in order to insert the SIM™ into the SIM3050.

Therefore there is a need for a low-profile module connector.

This background information is provided for the purpose of making known information believed by the applicant to be of possible relevance to the present technology. No admission is necessarily intended, nor should be construed, that any of the preceding information constitutes prior art against the present technology.

SUMMARY

An object of the present technology is to provide a reverse through-board low profile module connector. In accordance with an aspect of the present technology, there is provided connector component for operably coupling a removable integrated circuit component to a host PCB, the connector component comprising: a body portion comprising a cavity, the cavity configured for receiving the removable integrated circuit component therein; a coupling portion configured for coupling the connector component to a first face of the host PCB; and a port for facilitating insertion of the removable integrated circuit component into the cavity, wherein the connector component is configured for insertion into an aperture of the host PCB, the port of the connector component being exposed within a second face of the host PCB upon said insertion, the second face opposite the first face.

In accordance with another aspect of the present technology, there is provided an electronic device comprising a connector component for operably coupling a removable integrated circuit component to a host PCB, the connector component comprising: a body portion comprising a cavity, the cavity configured for receiving the removable integrated circuit component therein; a coupling portion configured for coupling the connector component to a first face of the host PCB; and a port for facilitating insertion of the removable integrated circuit component into the cavity, wherein the connector component is configured for insertion into an aperture of the host PCB, the port of the connector component being exposed within a second face of the host PCB upon said insertion, the second face opposite the first face.

In accordance with another aspect of the present technology, there is provided a method for mounting a connector component to a host PCT, the connector component for operably coupling a removable integrated circuit component to the host PCB, the method comprising: inserting the connector component into an aperture of the host PCB; electrically and mechanically coupling a coupling portion of the connector component to a first face of the host PCB; and exposing a port of the connector component within a second face of the host PCB, the second face opposite the first face, the port for facilitating insertion of the removable integrated circuit component into a cavity configured for receiving the removable integrated circuit component therein, wherein a body portion of the connector component is made to reside at least partly within the aperture, the body portion housing the cavity.

BRIEF DESCRIPTION OF THE FIGURES

These and other features of the technology will become more apparent in the following detailed description in which reference is made to the appended drawings.

DETAILED DESCRIPTION OF THE TECHNOLOGY

Definitions

Figure 1:
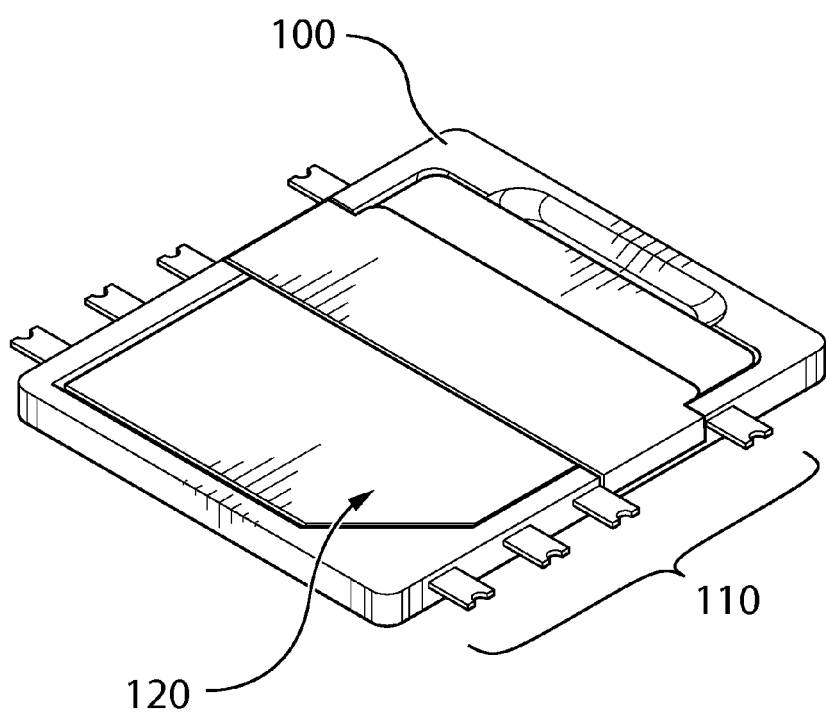
FIG. 1 illustrates a low-profile SIM connector in accordance with the prior art.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this technology belongs.

The present technology provides a connector component for operably coupling a removable integrated circuit component, such as a Micro SIM™ or other removable media component, to a host PCB. The connector component generally includes a body portion, a coupling portion, and a port. The body portion comprises a cavity which is configured for receiving the removable integrated circuit component therein. Once the removable integrated circuit component is received within the cavity, it may be electrically coupled to the host PCB via the connector component, for example by use of suitable electrical contacts located within the cavity, wherein the electrical contacts are coupled to external pins or leads of the connector component, or more particularly of the coupling portion. The coupling portion is configured for coupling the connector component to a first face of the host PCB. For example, the coupling portion may comprise SMT connectors, leads, pins, or the like, which can be soldered to corresponding pads of the host PCB. The port corresponds to an opening for facilitating insertion and removal of the removable integrated circuit component into and out of the cavity. The connector component is configured for insertion into an aperture of the host PCB, the port of the connector component being exposed within a second face of the host PCB upon said insertion, the second face opposite the first face.

In some embodiments, the removable integrated circuit component is a Micro SIM™, as identified above. In other embodiments, the removable integrated circuit component may be a Mini SIM™, a Nano SIM™, a memory card such as an SD™ card, Micro SD™ card, or the like, or other removable component such as a smart card, UICC, or the like.

As described above, the port is exposed within a second face of the host PCB. In various embodiments the first face of the host PCB may be populated with components while the second face of the host PCB may be substantially free of components, for example as in the case of a single-sided PCB. Embodiments of the present technology provide for a solution in which the port is exposed to the second face of the host PCB but does not protrude from the second face. This is in contrast to a low-profile solution, in which the port protrudes from the second face of the host PCB but to a small degree. In some embodiments, the component may be flush to the second face of the host PCB, that is, portions of the component may be present which are substantially coplanar with the second face of the host PCB. In some embodiments, the component may be recessed relative to the second face of the host PCB, that is, all portions of the component are located below the plane defined by the second face of the host PCB.

Embodiments of the present technology are distinguished from the prior art at least in part based on the feature of the access port being located on the opposite side of the PCB from the electrical connections on the PCB. Such electrical connections may be surface-mount connections, for example, but may also include electrical or mechanical connectors which are inserted at least partway into the PCB. Due to this configuration, the SIM™ or other removable integrated circuit component may be inserted through an unpopulated side of the PCB. This configuration can also allow for single-sided PCBs to be used for manufacture of the devices, which can reduce manufacturing costs.

In various embodiments, the cavity is configured to accommodate the removable integrated circuit component in both an engaged position and in an unengaged position. The component may be rocked or pivoted between the two positions by manual actuation, for example by pressing a finger down on one edge of the component to press it into the engaged position, and by pressing a finger down on an opposite edge of the component to pivot it into the unengaged position. In some embodiments, in the engaged position the removable integrated circuit card is completely housed within the cavity and electrically coupled to the set of leads. In the unengaged position the removable integrated circuit card partially protrudes from the cavity and out of the port, so that it can be grasped and removed.

Figure 2A:
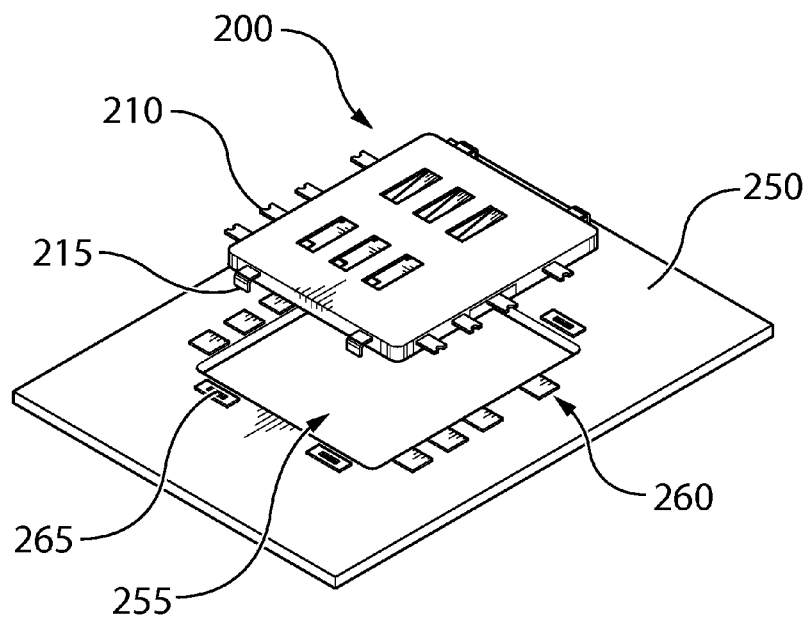
FIGS. 2a and 2b illustrate a top view of a connector component, in accordance with embodiments of the present technology.
Figure 2B:
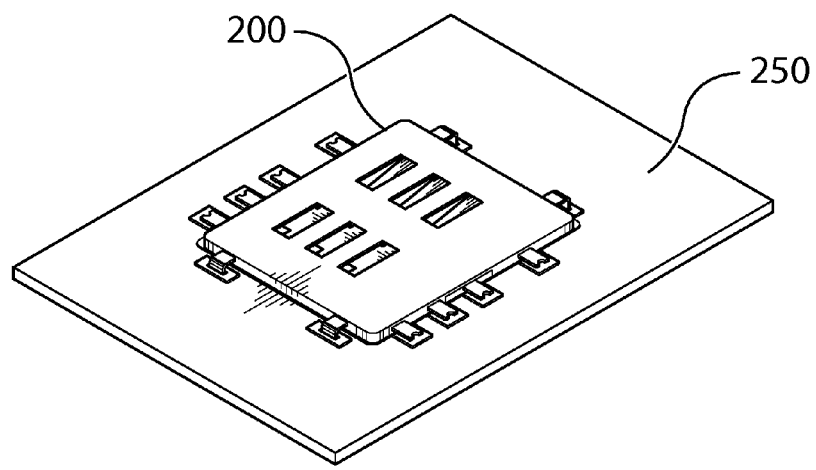

FIGS. 2a and 2b illustrate a top view of a connector component 200 in accordance with embodiments of the present technology. Also illustrated is a host PCB 250 having an aperture 255 and configured for receiving the connector component 200. FIG. 2a illustrates the connector component detached from the PCB, while FIG. 2b illustrates the connector component mounted to the PCB. A first side of the connector component is visible. The port is located on the underside of the connector component and is not visible. As illustrated, the first side includes a plurality of SMT leads 210 as well as a plurality of anchor leads 215. These leads correspond to the coupling portion of the connector component and are located at or near a top face of the connector component. However, other lead configurations are also possible. The SMT leads 210 can be soldered to corresponding pins and/or pads 260 of the host PCB. The anchor leads 215 can be inserted into corresponding apertures 265 in the host PCB, and may strengthen the mounting of the connector component to the PCB.

Figure 3A:
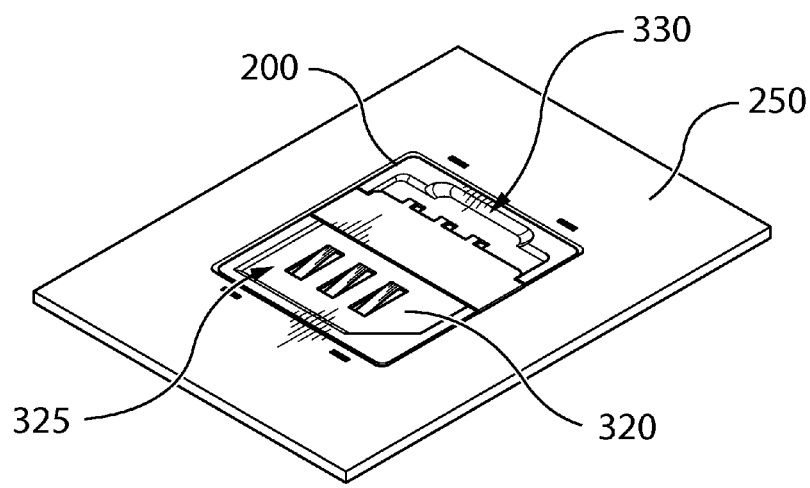
FIGS. 3a and 3b illustrate a bottom view of a connector component, in accordance with embodiments of the present technology.
Figure 3B:
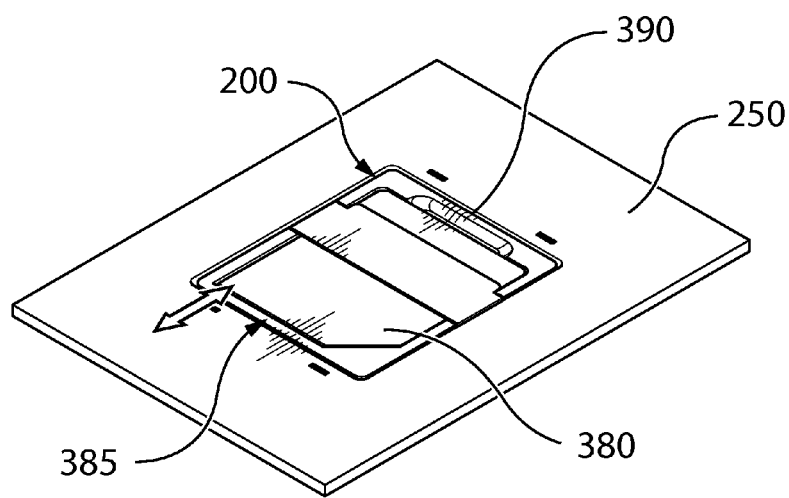

FIGS. 3a and 3b illustrate a bottom view of the connector component 200 mounted to the host PCB 250, in accordance with embodiments of the present technology. This view shows the underside of the connector component 200 which was not illustrated in FIGS. 2a and 2b. FIG. 3a illustrates the connector component without a removable integrated circuit component inserted therein, while FIG. 3b illustrates the connector component with a removable integrated circuit component 380 inserted therein. A cavity 320 within a body portion of the connector component houses the removable integrated circuit component 380. The removable integrated circuit component 380 may be inserted through a port 325 which in the present embodiment corresponds to a first opening in the cavity. The port is located on a bottom face of the connector component opposite the top face. Once the removable integrated circuit component 380 is inserted through the port 325, it can be pivoted into position by pressing down on a first edge 385 of the connector component. A second opening 330 in the cavity may be used to press down on a second edge 390 of the removable integrated circuit component 380 in order to pivot it into a tilted position for removal. The side of the host PCB 250 which is illustrated in FIGS. 3a and 3b is free from connections or soldering points for mounting the component 200. Thus, this side of the PCB 250 is free from protrusions related to the component.

Figure 4:
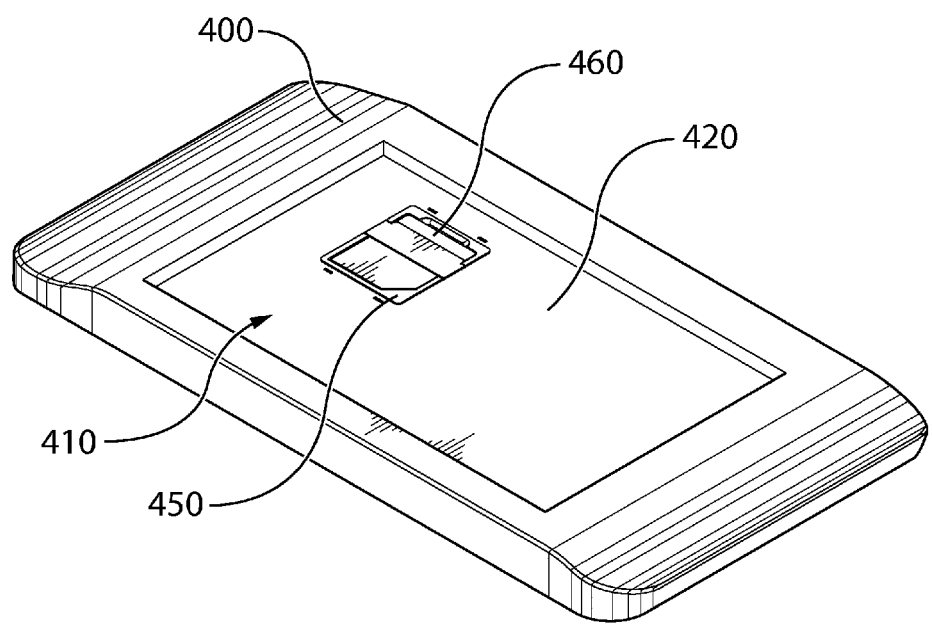
FIG. 4 illustrates a wireless device comprising a connector component, in accordance with embodiments of the present technology.

FIG. 4 illustrates a wireless device 400 comprising a connector component 450 in accordance with embodiments of the present technology. The wireless device may be a mobile hotspot, smartphone, machine type wireless device, or the like. More generally, the connector component may be integrated into another type of electronic device, such as a consumer electronic device requiring a removable component such as an SD™ card, SIM™, or the like. The wireless device 400 comprises a cavity 410, which may be a battery compartment. An interior face of the cavity 410 is bounded by a PCB 420, which is substantially or completely free of mounted components. This may correspond, for example, to the unpopulated side of a single-sided PCB. The PCB 420 comprises the connector component 450 mounted within an aperture of the PCB. A user can access the connector component to insert or remove a removable integrated circuit component such as a micro SIM™ 460. Since the PCB includes an unpopulated side, less clearance may be required within the cavity which results in a lower profile device. In addition, cost savings may be realized by populating only one side of the PCB, due to simplifications in manufacturing, for example.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

We claim:

1. A connector component for operably coupling a removable integrated circuit component to a host PCB, the connector component comprising:
   a. a body portion comprising a cavity, the cavity configured for receiving the removable integrated circuit component therein;
   b. a coupling portion configured for coupling the connector component to a first face of the host PCB; and
   c. a port for facilitating insertion of the removable integrated circuit component into the cavity,
   wherein the connector component is configured for insertion into an aperture of the host PCB, the port of the connector component being exposed within a second face of the host PCB upon said insertion, the second face opposite the first face.

2. The connector component according to claim 1, wherein the connector component is flush with the second face of the PCB.

3. The connector component according to claim 1, wherein the connector component is recessed with respect to the second face of the PCB.

4. The connector component according to claim 1, wherein the removable integrated circuit component is a Micro SIM™.

5. The connector component according to claim 1, wherein the removable integrated circuit component is a Nano SIM™.

6. The connector component according to claim 1, wherein the coupling component comprises one or more leads for soldering to corresponding pads of the PCB.

7. The connector component according to claim 1, further comprising one or more conductors configured to electrically connect the removable integrated circuit component to the host PCB upon insertion of the removable integrated circuit component.

8. The connector component according to claim 1, wherein the second face of the host PCB is unpopulated with components.

9. The connector component according to claim 1, wherein a predetermined region of the second face of the host PCB is unpopulated with components, said predetermined region surrounding the aperture of the host PCB.

10. An electronic device comprising the connector component according to claim 1.

11. The electronic device according to claim 10, wherein the host PCB is located inside a battery compartment of the wireless device.

12. The electronic device according to claim 10, wherein the electronic device is a wireless device and the removable integrated circuit component is a Micro SIM™ or a Nano SIM™.

13. A method for mounting a connector component to a host PCB, the connector component for operably coupling a removable integrated circuit component to the host PCB, the method comprising:
   a. inserting the connector component into an aperture of the host PCB;
   b. electrically and mechanically coupling a coupling portion of the connector component to a first face of the host PCB; and
   c. exposing a port of the connector component within a second face of the host PCB, the second face opposite the first face, the port for facilitating insertion of the removable integrated circuit component into a cavity configured for receiving the removable integrated circuit component therein,
   wherein a body portion of the connector component is made to reside at least partly within the aperture, the body portion housing the cavity.

14. The method according to claim 13, wherein electrically and mechanically coupling the coupling portion of the connector component to the first face of the host PCB comprises soldering the connector component to the host PCB.

* * * * *